United States Patent [19]

Malloy et al.

[11] Patent Number: 4,501,675

[45] Date of Patent: * Feb. 26, 1985

[54] ENHANCED OIL RECOVERY

[75] Inventors: Thomas P. Malloy, Lake Zurich; Raymond J. Swedo, Mount Prospect, both of Ill.

[73] Assignee: UOP Inc., Des Plaines, Ill.

[*] Notice: The portion of the term of this patent subsequent to Nov. 8, 2000 has been disclaimed.

[21] Appl. No.: 514,717

[22] Filed: Jul. 18, 1983

Related U.S. Application Data

[63] Continuation-in-part of Ser. No. 274,915, Jun. 18, 1981, abandoned.

[51] Int. Cl.³ ............................................. E21B 43/22
[52] U.S. Cl. ........................... 252/8.55 D; 260/504 R; 260/505 R; 260/505 A; 260/505 C; 166/273
[58] Field of Search ................. 252/8.55 D; 166/273; 260/504 R, 505 R, 505 A, 505 C

[56] References Cited

U.S. PATENT DOCUMENTS

| | | | |
|---|---|---|---|
| 2,227,999 | 1/1941 | Brandt et al. | 260/505 |
| 3,508,611 | 4/1970 | Davis, Jr. et al. | 252/8.55 D |
| 3,536,136 | 10/1970 | Jones | 166/252 |
| 3,970,690 | 7/1976 | Suzuki et al. | 260/505 C |
| 3,981,361 | 9/1976 | Healy | 166/252 |
| 4,058,467 | 11/1977 | Sias | 252/8.55 D |
| 4,110,229 | 8/1978 | Carlin et al. | 252/8.55 D |
| 4,411,802 | 10/1983 | Lester et al. | 252/8.55 D |
| 4,414,120 | 11/1983 | Malloy et al. | 252/8.55 D |

*Primary Examiner*—A. Lionel Clingman
*Attorney, Agent, or Firm*—James R. Hoatson, Jr.; Raymond H. Nelson; William H. Page, II

[57] ABSTRACT

Petroleum may be recovered from subterranean formation in an enhanced oil recovery process by utilizing an aqueous surfactant slug comprising a mixture of a sulfonate of a gas oil which has been obtained from the thermal cracking of coal, a lower alkyl alcohol containing from about 3 to about 6 carbon atoms and a non-ionic surfactant comprising an ethoxylated alcohol containing from about 12 to about 15 carbon atoms. The surfactant slug will be present in an amount sufficient to reduce the interfacial tension between the petroleum and water, thus enabling the petroleum to be recovered in an increased amount.

8 Claims, No Drawings

ENHANCED OIL RECOVERY

CROSS-REFERENCE TO RELATED APPLICATION

This application is a continuation-in-part of our co-pending application Ser. No. 274,915 filed June 18, 1981, now abandoned, all teachings of which are incorporated herein by reference thereto.

BACKGROUND OF THE INVENTION

It is well known in the petroleum field that petroleum which is found in subterranean reservoirs is recovered by many different methods. The primary method of petroleum recovery is by the primary recovery means which employs natural forces such as pressure, either by the petroleum itself or by the presence of gases, whereby petroleum is forced from the subterranean reservoir to the surface and recovered. Subsequent to the recovery of the petroleum by the primary means, due to the dissipation of the natural or gaseous pressure, more of the petroleum in the reservoir may be recovered by a secondary process in which water is forced into the reservoir to provide the pressure necessary to force the petroleum from the reservoir to the surface.

At some point in the recovery of petroleum, a state is reached in which it is more costly to use the water pumped in relative to the amount of oil which is recovered by this method. However, inasmuch as a relatively large amount of petroleum may still be present in the reservoir, either in a pool or by being trapped in interstices of relatively porous rock, it is necessary to effect the recovery of the petroleum by a tertiary method. The tertiary method or the enhanced oil recovery method may be effected by many different methods. For example, one tertiary recovery method may be thermal in nature in which steam is pumped into the reservoir to force the oil to the surface. However, some oil may be lost due to burning and, by combining the cost of the lost oil with the cost of the equipment and energy necessary to form the steam, may render such a method economically unattractive to operate. A second tertiary recovery method may comprise a fire flood method in which a portion of oil is ignited to create gases as well as reducing the viscosity of the heavy crude with a concomitant increase in pressure to force the oil from the reservoir. However, as in the method previously discussed, the drawback to this method is in the fact that some of the assets are being destroyed, thus increasing the cost of the operation. A third method for enhanced oil recovery is in the use of carbon dioxide to provide the pressure required to force the oil to the surface. In this method, the carbon dioxide is pumped into the oil reservoir to dissolve some of the heavies present which, in turn, will reduce the viscosity and allow the oil to reach the surface. The disadvantage which is present when utilizing such a method is the requirement for relatively expensive equipment to produce the carbon dioxide. In addition, the method is dependent upon the ready availability of carbon dioxide. Yet another method for enhanced oil recovery is found in the use of chemicals such as water-soluble polymers including polyacrylamide, biopolymers, etc. These polymers will increase the viscosity of the water in the solution and render the mobility ratio of water to oil more favorable whereby the solution will act more favorably as a plug.

Another method of effecting an enhanced oil recovery is by utilizing surfactants as a plug, whereby the oil which is present in the reservoir may be recovered by injecting an aqueous fluid containing a surfactant or a combination of surfactants along with other compounds into the reservoir. The use of surfactants in this system is necessary inasmuch as water alone does not displace petroleum with a relatively high degree of efficiency. This occurs due to the fact that water and oil are relatively immiscible and, in addition, the interfacial tension between water and oil is relatively high. The use of surfactants will lower or reduce the interfacial tension between the water and the oil, thus reducing the force which retains the oil which has been trapped in capillaries.

The prior art is replete with various surfactants which have been used in this tertiary system for the recovery of petroleum. One type of surfactant which has been employed in many processes involves the use of a petroleum sulfonate as disclosed in U.S. Pat. Nos. 3,508,611, 3,981,361 and 4,058,467. The petroleum sulfonate fractions which are utilized in these processes have been obtained by sulfonating at least a portion of a sulfonatable hydrocarbon such as petroleum fractions as exemplified by a crude oil. However, this crude oil feedstock contains a vast and varied number of chemical structures including aromatic hydrocarbons, paraffinic hydrocarbons, olefinic hydrocarbons, to name a few. However, a disadvantage in utilizing crude oil as a feedstock is that the feedstock usually does not contain a major portion of aromatic compounds which are the effective material which is sulfonated. As will hereinafter be shown, by utilizing a feedstock of the type of the present invention, it will be possible to obtain a greater amount of sulfonated product which is therefore available to act in the capacity of lowering the interfacial tension between oil and water when used as a surfactant.

As was previously discussed, prior U.S. patents teach the use of these petroleum sulfonates as one component of a surfactant mixture which may be used in a surfactant oil recovery process. For example, U.S. Pat. No. 4,214,999 discloses a surfactant fluid for use in flooding subterranean formations which contain petroleum comprising petroleum sulfonates possessing certain average equivalent weights and a solubilizing cosurfactant such as ethoxylated alkanols, sulfates or sufonates. U.S. Pat. No. 4,013,569 also discloses a surfactant system for the recovery of petroleum utilizing a relatively water-soluble aromatic ester polysulfonate as one component in the system. Another U.S. patent, namely, U.S. Pat. No. 4,008,165, utilizes an aqueous surfactant containing fluid which includes a mixture of three surfactant materials including a sulfonate surfactant derived from an alkyl or alkyl aromatic radical along with a phosphate ester surfactant and a sulfonated betaine, the system also being utilized in an oil recovery process.

BRIEF SUMMARY OF THE INVENTION

This invention relates to a process for the recovery of petroleum from subterranean reservoirs. More specifically, the invention is concerned with an enhanced oil recovery process in which petroleum which is present in a subterranean reservoir is recovered by utilizing a surfactant slug containing, as one component thereof, a sulfonate of a gas oil which has been obtained from the thermal cracking of coal.

As hereinbefore set forth, the recovery of petroleum from reservoirs must be accomplished in a commercial manner which is economically viable to operate. It is necessary, in many instances, to insure the complete recovery of petroleum from a particular reservoir in order to justify the expenditures which have been made in locating, drilling, etc. the particular reservoir. After recovery of the petroleum by primary means, such as natural forces of pressure as from an underlying water drive of gas dissolved in the petroleum which can exert a sufficient amount of pressure within the formation to force the petroleum up the well and to the surface, a secondary means of recovery may be expended. This supplemental recovery process may be accomplished by water-flooding in which water is injected into the subterranean reservoir or formation. Following this, a tertiary or enhanced oil recovery system may be employed to further recover additional amounts of petroleum still present in the formation.

It is therefore an object of this invention to provide a process for the enhanced recovery of oil.

A further object of this invention is found in a process for the enhanced recovery of oil utilizing a surfactant slug containing a particular compound which acts as a surfactant for lowering the interfacial tension between the petroleum and water.

In one aspect an embodiment of this invention resides in a process for the enhanced recovery of oil from a subterranean reservoir of oil which comprises the introduction of a three-component aqueous surfactant into said subterranean reservoir of oil to enhance the displacement of said oil from said reservoir.

A specific embodiment of this invention resides in a process for the enhanced recovery of oil from a subterranean reservoir of oil which comprises the introduction of a three-component aqueous surfactant into said subterranean reservoir to reduce the interfacial tension between the oil and water, thus enhancing the displacement of said oil from said reservoir, said slug comprising a surfactant of a gas oil which has been obtained from the thermal cracking of coal and which possesses a molecular weight of from about 240 to about 550, said sulfonate having been neutralized by the addition of sodium hydroxide, a lower alkyl alcohol containing from about 3 to about 6 carbon atoms and a non-ionic ethoxylated normal alcohol containing from about 12 to about 15 carbon atoms.

Other objects and embodiments will be found in the following further detailed description of the present invention.

DETAILED DESCRIPTION OF THE INVENTION

As hereinbefore set forth, the present invention is concerned with a surfactant slug which is used in an enhanced oil recovery process, said slug utilizing as one component thereof a sulfonate of a gas oil which has been obtained from the thermal cracking of coal. As was previously discussed, surfactant slugs which have been used in enhanced oil recovery processes have contained, as one of the components of the slug, a sulfonated petroleum fraction. In contradistinction to this, the slug which is employed in the process of the present invention utilizes as one component thereof, a sulfonate of a gas oil which has been obtained from the thermal cracking of coal, said sulfonate providing enhanced oil recovery properties superior to those which are present when utilizing a sulfonated petroleum fraction. Coal, which contains a wide variety of chemical compounds, is highly aromatic in nature and the gas oil which is obtained from the thermal cracking of the coal possesses a highly aromatic content. This highly aromatic content can readily be sulfonated by conventional means hereinafter set forth in greater detail to produce a compound which will be useful in decreasing the interfacial tension between petroleum and water. In addition to possessing the ability to be highly sulfonated, gas oils which are obtained from coal also have the advantage of being able to tolerate the presence of sodium chloride which is usually present in the water and which tends to precipitate a sulfonate derived from petroleum. The precipitation of petroleum sulfonate will decrease the ability of the sulfonate to act as a surfactant in reducing the interfacial tension. Other advantages of sulfonates of gas oils lie in the tolerances of the sulfonate for calcium and magnesium, thereby preventing the exchange of the sodium with the subsequent precipitation hereinbefore discussed as well as a solubility of the sulfonated gas oil in water.

The gas oils which may be sulfonated and act as one component of a surfactant slug are obtained by the thermal cracking of a coal slurry under a hydrogen pressure. The thermal cracking of the coal may be effected in any manner known in the art and is usually prepared by treating coal at a temperature in the range of from about 700° to about 1000° F. under a hydrogen pressure which may range from about 500 to about 3000 psi. It is contemplated within the scope of this invention that any type of coal may be subjected to the thermal cracking process, either anthracite or bituminous in nature, the latter type of coal being preferred.

As hereinbefore set forth, the surfactant slug which is utilized in the process for the enhanced recovery of oil from a subterranean petroleum reservoir comprises a mixture of a sulfonate of a gas oil which has been obtained from the thermal cracking of coal. The sulfonate is utilized in a neutralized state by treatment with a compound selected from the group consisting of ammonium hydroxide and a salt or a hydroxide of a metal of Group IA or IIA of the Periodic Table. Some representative examples of these compounds which may be utilized to neutralize the sulfonate will include ammonium hydroxide, sodium hydroxide, potassium hydroxide, lithium hydroxide, magnesium hydroxide, calcium hydroxide, strontium hydroxide, ammonium carbonate, sodium carbonate, potassium carbonate, lithium carbonate, magnesium carbonate, calcium carbonate, strontium carbonate, etc. The neutralization of the sulfonate is accomplished by any manner known in the art and is not germane to the instant invention.

As will hereinafter be shown, by utilizing the aforesaid sulfonate as one component, it is possible to obtain a greater degree of oil recovery than has been obtained when utilizing other surfactant slugs which contain a sulfonated petroleum product.

A second component of the surfactant slug will comprise a cosurfactant, said cosurfactant consisting of a lower alkyl alcohol containing from about 3 to about 6 carbon atoms such as n-propyl alcohol, isopropyl alcohol, n-butyl alcohol, sec-butyl alcohol, n-amyl alcohol, sec-amyl alcohol, n-hexyl alcohol, sec-hexyl alcohol, etc.

It is also contemplated within the scope of this invention that a third component of the surfactant slug will comprise a non-ionic surfactant comprising an ethoxylated normal alcohol containing from about 12 to about 15 carbon atoms in length. Specific examples of these alcohols will include ethoxy-n-dodecyl alcohol, ethoxyn-tridecyl alcohol, ethoxy-n-tetradecyl alcohol, ethoxy-n-pentadecyl alcohol, etc. The amounts of the three components of the surfactant slug will usually comprise from about 1% to about 10% of the neutralized sulfonate of the coal oil, from about 1% to about 10% of the lower alkyl alcohol cosurfactant, and from about 0.1% to about 2% of the non-ionic ethoxylated n-alcohol surfactant. In addition, if so desired, it is also contemplated within the scope of this invention that sodium chloride may also be present in an amount in the range of from about 1% to 5%. However, the presence of this salt is not essentially necessary for the operation of the surfactant slug in lowering the interfacial tension between the petroleum and the slug.

By utilizing a surfactant slug containing the components hereinbefore described in an amount sufficient to reduce the interfacial tension between the oil and water, that is, said slug being present in a range from about 0.1% to about 30%, it is possible to effect an enhanced oil recovery. This enhanced oil recovery is effected by displacing the petroleum which is still present in the subterranean reservoirs from the reservoir and from the interstices of relatively porous rocks also present in an economically attractive manner.

The sulfonate of a gas oil obtained by the thermal cracking of coal may be prepared by treating the coal gas oil in an appropriate reaction flask with a sulfonating agent such as sulfur trioxide or sulfuric acid in the presence, if so desired, of an organic solvent which may include paraffins such as pentane, hexane, heptane, etc., and cycloparaffins such as cyclopentane, methylcyclopentane, cyclohexane, etc. As one example of a sulfonation process, the coal gas oil may be charged to a reaction flask along with the desired solvent and thereafter charging liquid sulfur trioxide under a nitrogen blanket to the reaction apparatus. The addition of the sulfur trioxide to the coal gas oil may be effected at ambient temperature or temperatures slightly in excess of ambient, that is, up to about 50° C. over a relatively long period which may range from 1 to 10 hours or more in duration. Upon completion of the desired reaction period, the mixture may then be neutralized by the addition of an alkaline component of the type hereinbefore set forth in greater detail until an alkaline pH in excess of 7 is reached, thereafter water is added to the reaction mixture along with an equal amount of an alcohol such as isopropyl alcohol. After thorough agitation, the mixture is then heated to a temperature in the range of from about 50° to about 75° C. for a predetermined period of time and thereafter allowed to cool. The alkaline sulfonate which separates upon cooling is then removed by conventional means such as filtration, centrifugation, etc. and after the mixture is allowed to settle, it will separate into two layers. The lower aqueous/alcohol layer may then be extracted with an organic solvent such as hexane until the extracts are not colored. The upper organic layer along with the combined extracts may then be washed with water which is added to the aqueous layer. Thereafter, the aqeuous layer is allowed to evaporate to dryness or a drying means such as a steam bath is used to yield the neutralized sulfonate derivative of the coal gas oil.

The surfactant slug or system of the present invention may be formulated by admixing a predetermined amount of the aforesaid neutralized sulfonate derivative of the coal gas oil, the cosurfactant and the non-ionic surfactant, said amounts being mixed in a water medium. The water medium which is selected for the surfactant slug will usually consist of field water which, in many instances, comprises a low gravity brine. The thus prepared surfactant slug is then utilized for a tertiary method of enhanced oil recovery. In effecting the enhanced oil recovery process, the subterranean reservoir containing the oil may be subjected to a pre-flush treatment with fresh water in order to displace the water which has been used in the secondary process and which may possess a high degree of salinity and/or hardness from the flow channels of the formation. Following the pre-flush treatment, the surfactant slug is injected until the desired volume of surfactant fluid is present in the petroleum-containing formation. The surfactant slug, due to the presence of the various components including the sulfonates of a gas oil obtained by the thermal cracking of coal, will lower the interfacial tensions between the oil and the water and thus assist in forcing the oil through the formation into the wells and through the wells to the surface for recovery thereof. Following the recovery of the oil, a further water injection is made into the formation, this water being sufficient to displace the surfactant and displaced oil so that the recovery of the oil is effected in such an amount as to render the process economically feasible.

As hereinbefore set forth, the sulfonates of a gas oil which are obtained by the thermal cracking of coal will be relatively inexpensive in nature and will possess the ability to lower the interfacial tension between petroleum and water.

The following examples are given for purposes of illustrating the sulfonation of coal gas oils and other physical characteristics which the sulfonated product possesses, thus rendering the sulfonates applicable for use in an enhanced oil recovery process. However, it is to be understood that these examples are merely illustrative and that the present process is not limited thereto.

EXAMPLE I

In this example, a gas oil having the designation SRC-1 (Solvent Refined Coal) was sulfonated and neutralized by placing 0.5 mole of the coal gas oil (based on its average molecular weight as determined by osmometry) in a reaction flask fitted with a mechanical stirrer, thermometer, a reflux condenser, and a gas inlet tube. The coal gas oil is obtained by pulverizing raw coal and mixing the pulverized coal with a coal-derived solvent boiling in the general range of from about 288° to about 427° C. Hydrogen, or a hydrogen-rich synthesis gas is added to the coal-solvent slurry and passed through a preheater to a dissolver vessel. The dissolver vessel is operated at a temperature of about 435° C. and a pressure of 1000 psi utilizing an excess of hydrogen. Approximately 90% of the coal is dissolved in this vessel and the product stream consisting of the coal solution, unreacted coal, undissolved mineral matter, light hydrocarbon gases and excess hydrogen is recovered. The excess hydrogen and light hydrocarbon gases are separated from the product slurry which is then pumped to a filtration section where the undissolved coal solids are separated from the coal solution. The filtrate is sent to a vacuum-flash distillation step for removal of the solvent, while the bottoms fraction which has a solidification point of about 177° C. is recovered.

The composition of the coal gas oil as determined by high resolution mass spectrometry showed 8.4 wt. % saturated hydrocarbons, 53.8 wt. % aromatic hydrocarbons, 7.0 wt. % aromatic nitrogen, 27.6 wt. % aromatic dioxygens, 0.3 wt. % aromatic trioxygens, and 1.2 wt. % aromatic sulfurs. Following this, 150 ml of hexane were added to moderate the viscosity of the mixture. In addition, 20.4 ml (0.5 mole) of liquid sulfur trioxide were charged to a separate bubbler. Nitrogen lines were attached to the gas inlet tube of the reaction flask and to the inlet tube of the gas bubbler. Likewise, the outlet tube of the gas bubbler was also connected to the gas inlet tube of the reaction flask. Nitrogen was charged at a sufficient rate in order to insure that the sulfur trioxide was delivered to the reaction flask as a 5–10% gaseous component of the nitrogen stream. The addition of the $SO_3$ was accomplished during a period of three hours in order to permit a maximum absorption of the $SO_3$ and to maintain the reaction temperature in a range of from about 25° to about 40° C.

At the end of the three hour period, nitrogen was allowed to pass through the reaction mixture for an additional period of 1 hour, following which the mixture was then neutralized to a pH of about 8 utilizing a solution containing 50% by weight of sodium hydroxide. In addition, about 175 ml of water which was equivalent to the volume of the reaction mixture was also added. Thereafter, an equal amount of isopropanol was added, the mixture was heated to a temperature of 60° C. in a steam bath and, after maintaining the mixture at this temperature for a period of ¼ hour, the flask was removed from the steam bath and placed in a refrigerator wherein it was cooled for a period of 4 hours. The sodium sulfate which separated on cooling was removed by a suction filtration and the solid was washed with isopropyl alcohol. The filtrate and the washings, upon standing, separated into two layers, the upper organic layer being a mixture of oil and hexane, while the lower layer was a mixture of the aqueous solution and isopropyl alcohol. The lower aqueous layer was extracted with hexane until the extracts were almost colorless following which the combined extracts and original upper layer were washed with 100 ml of water which was then added to the aqueous layer. The aqueous layer was evaporated to dryness utilizing a steam bath and the solids which comprised the sodium sulfonate derivatives of the coal gas oil were recovered.

EXAMPLE II

In a manner similar to that set forth in Example I above, a coal gas oil having the designation H-Coal was sulfonated. The coal gas oil is obtained by slurrying dried, pulverized coal with a processderived oil to which is added compressed make-up hydrogen. The slurry and hydrogen are heated in a preheater prior to being fed to the base of a catalytic reactor containing a Co/Mo catalyst along with recycled high pressure gas that is similarly preheated. The catalyst in the reactor is suspended in an ebulliated-bed by additional internal recycleoil flow provided by a hot-oil recycle pump. The reactor product slurry is let down at essentially reactor temperature to an atmospheric pressure flash drum in which a portion of the lighter hydrocarbon liquid is flash-vaporized and fed to an atmospheric distillation tower. The slurry material remaining after the atmospheric flash can be further flashed in a vacuum drum to obtain vacuum distillate overhead and a vacuum bottoms slurry product.

The composition of the H-Coal by means of high resolution mass spectrometry showed 14.2 wt. % saturated hydrocarbons, 73.3 wt. % aromatic hydrocarbons, 5.6 wt. % aromatic nitrogen, 5.3 wt. % aromatic oxygens, 0.4 wt. % aromatic dioxygens, 0.2 wt. % aromatic trioxygens, 0.06 wt. % aromatic sulfurs, and 1.0 wt. % non-volatile. Utilizing the identical technique set forth in Example I above, the sodium sulfonate derivative of the coal gas oil was obtained in a 43 wt. % yield. The sulfonate salts had an equivalent weight of 269 determined by titration and a theoretical equivalent weight of 315.

EXAMPLE III

In this example, a coal gas oil designated as EDS (Exxon Donor Solvent) having a composition, as determined by high resolution mass spectrometry of 11.6 wt. % saturated hydrocarbons, 63.5 wt. % aromatic hydrocarbons, 3.9 wt. % aromatic nitrogen, 14.5 wt. % aromatic oxygens, 1.6 wt. % aromatic dioxygens, 0.2 wt. % aromatic trioxygens, 0.2 wt. % aromatic sulfurs, and 4.4 wt. % non-volatile was sulfonated and neutralized in a manner similar to that set forth in Example I above. The coal gas oil is obtained by slurrying crushed coal with a recycled solvent, preheating the slurry to a temperature of about 425° C. and then pumping the slurry into a liquefaction reactor operating at a pressure of about 2000 psi. In addition, preheated hydrogen is also added to the reactor. The product from the liquefaction reactor is sent to a separation step where gas, naphtha, recycled solvent, distillate and heavy bottoms which contain unconverted coal and minerals are separated by distillation. The raw liquid product is upgraded by hydrogenation to adjust the quality of the product by desulfurizing and conversion.

The sodium sulfonate derivative of the coal gas oil was obtained in a 44 wt. % yield, said sulfonate salts having an average equivalent weight determined by titration of 302 with a theoretical equivalent weight of 355.

EXAMPLE IV

The interfacial tension measurements of the sodium sulfonate derivative of the coal gas oils were obtained by using the spinning drop technique set forth in the article "Adsorption at Interfaces", by J. L. Cayias, R. S. Schechter, and W. H. Wade, ACS Symposium Series No. 8, 1975, Page 234. Solutions of the SRC-2, H-Coal, and EDS coal gas oil sulfonate salts were measured against a series of pure hydrocarbons. In the first series of measurements, sodium chloride concentration was either 0 wt. % or 1 wt. % and the isopropyl alcohol (IPA) or isoamyl alcohol (IAA) co-surfactant concentration was either 0 vol. % or 2 vol %. The results of these measurements are set forth in Table I below.

TABLE I

| IFT DATA OF COAL GAS OIL SULFONATE SALTS | | | | | |
|---|---|---|---|---|---|
| Coal Gas Oil Sulfonate Salt[A] | Equiv. Wt.[B] | Wt. % NaCl | Vol. % (ROH) | EACN | IFT[C] (Dynes/Cm) |
| SRC-II | 254 | 1 | — | 16 | $1.91 \cdot 10^{-3}$ |
|  |  | 1 | 2(IPA) | 16 | $1.24 \cdot 10^{-3}$ |
|  |  | 1 | 2(IAA) | 12 | $1.71 \cdot 10^{-3}$ |
| H-Coal | 269 | — | — | 12 | $1.13 \cdot 10^{-3}$ |
|  |  | 1 | 2(IPA) | 16 | $2.51 \cdot 10^{-3}$ |
|  |  | 1 | 2(IAA) | 16 | $1.19 \cdot 10^{-3}$ |
| EDS | 302 | — | — | 10 | $2.27 \cdot 10^{-3}$ |
|  |  | — | — | 15 | $1.51 \cdot 10^{-3}$ |
|  |  | 1 | 2(IAA) | 7 | $9.80 \cdot 10^{-3}$ |
|  |  |  |  | 12 | $1.01 \cdot 10^{-3}$ |

[A]Sulfonate salt conc. is 0.70 g/l in each case.
[B]Determined by titration.
[C]Minimum value.

EXAMPLE V

To illustrate the ability of a compound which has been derived from a gas oil resulting from the thermal cracking of coal, such a gas oil was alkylated in a normal fashion by treatment with an alphaolefin comprising undecene. The resulting alkylated coal gas oil was then sulfonated and neutralized in a manner similar to that hereinbefore set forth. A surfactant slug was prepared by dissolving 5.0 wt. % of this alkylated coal gas oil and 3.0% by weight of isobutanol in a 1.0 wt. % sodium chloride solution. The surfactant slug was utilized to displace an oil sample from a sand pack core in a manner hereinafter described. In addition, a second surfactant slug was prepared by dissolving 5.0 wt. % of a petroleum sulfonate and 3.0% by weight n-butanol in a 1.0% by weight sodium chloride solution.

The recovery of oil was effected by packing a glass column with sand. Following this, the dry sand was flooded with a brine solution. Thereafter, the sand was saturated with 22.7 ml of an oil comprising 99.4% paraffin and 0.6% aromatics. The saturated sand was then washed with a brine solution until a constant residual oil content was attained, the washing with the brine solution simulating a secondary oil recovery process. After attaining the constant residual oil figure, the surfactant slugs were injected into the sand to recover an additional amount of oil in a simulated tertiary oil recovery process. After injection of the surfactant slugs, the sand was then continuously washed with a 1% sodium chloride solution containing 1000 ppm of polyacrylamide. The results of the two tests are set forth in Table II below in which surfactant slug "A" comprised the slug of the present invention, while surfactant slug "B" comprised a slug prepared from a sulfonate petroleum fraction.

TABLE II

|  | A | B |
|---|---|---|
| Sand Mix, g | 336.32 | 333.09 |
| Pore Volume, ml | 59.50 | 66.5 |
| Porosity | 0.2997 | 0.335 |
| Permeability, milli darcies | 491 | 440 |
| Oil Saturation |  |  |
| Pore Volume | 0.4953 | 0.341 |
| Ml | 29.47 | 22.7 |
| Residual Oil |  |  |
| Pore Volume | 0.0861 | 0.068 |
| Ml | 5.12 | 4.6 |
| Slug Size |  |  |
| Pore Volume | 0.05 | 0.05 |
| Ml | 2.975 | 3.325 |
| Recovered Oil |  |  |
| Pore Volume | 0.0079 | 0.005 |
| Ml | 0.47 | 0.3 |
| % | 9.2 | 6.6 |

It is apparent from a review of the results set forth in Table II above that the use of an aqueous surfactant slug in an enhanced oil recovery process, containing as one component thereof an alkylated sulfonate of a gas oil which has been obtained by the thermal cracking of coal, will result in the recovery of approximately 40% more oil than is obtained when utilizing a petroleum sulfonate as one component of the surfactant slug.

We claim as our invention:

1. A process for the enhanced recovery of oil from a subterranean reservoir of oil which comprises the introduction of a three-component aqueous surfactant into said subterranean reservoir; the three components of said surfactant being:
   (1) from about 1% to about 10% of a sulfonate of a gas oil having a molecular weight of from about 240 to about 550 and which has been obtained from the thermal cracking of coal;
   (2) from about 1% to about 10% of a lower alkyl alcohol containing from about three to about six carbon atoms; and
   (3) from about 0.1% to about 2% of a non-ionic ethoxylated normal alcohol containing from about 12 to about 15 carbon atoms; wherein said three components of said aqueous surfactant are present in a sufficient amount to reduce the interfacial tension between said oil and water.

2. The process as set forth in claim 1 in which said sulfonate of said gas oil is neutralized by the addition of a compound selected from the group consisting of ammonium hydroxide and a salt or hydroxide of a metal of Group IA and IIA of the Periodic Table.

3. The process as set forth in claim 2 in which said metal is sodium.

4. The process as set forth in claim 2 in which said metal is potassium.

5. The process as set forth in claim 2 in which said metal is lithium.

6. The process as set forth in claim 2 in which said hydroxide is sodium hydroxide.

7. The process as set forth in claim 2 in which said hydroxide is potassium hydroxide.

8. The process as set forth in claim 2 in which said hydroxide is lithium hydroxide.

* * * * *